United States Patent
Schweitzer

(10) Patent No.: US 9,727,735 B2
(45) Date of Patent: Aug. 8, 2017

(54) METHOD AND SYSTEM FOR SIMULATING THE EFFECTS OF AN ATTACK ON A COMPUTER CODE

(71) Applicant: Oberthur Technologies, Colombes (FR)

(72) Inventor: Antoine Schweitzer, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/261,768

(22) Filed: Apr. 25, 2014

(65) Prior Publication Data

US 2014/0325658 A1 Oct. 30, 2014

(30) Foreign Application Priority Data

Apr. 25, 2013 (FR) ...................................... 13 53767

(51) Int. Cl.
*G06F 21/55* (2013.01)
*G06F 21/57* (2013.01)
*H04L 29/06* (2006.01)

(52) U.S. Cl.
CPC ............ *G06F 21/577* (2013.01); *G06F 21/55* (2013.01); *H04L 63/1466* (2013.01)

(58) Field of Classification Search
CPC ..... G06F 21/55; G06F 21/577; H04L 63/1466
See application file for complete search history.

(56) References Cited

U.S. PATENT DOCUMENTS

| | | | |
|---|---|---|---|
| 6,112,298 A * | 8/2000 | Deao et al. .................... 712/227 |
| 7,134,025 B1 * | 11/2006 | Trimberger ......... G06F 12/1425 711/154 |
| 8,464,219 B1 * | 6/2013 | Wilkerson .................... 717/120 |
| 2003/0093683 A1 * | 5/2003 | Wong .................... G06F 21/126 713/189 |
| 2005/0050387 A1 * | 3/2005 | Mariani et al. ................ 714/13 |
| 2006/0129880 A1 * | 6/2006 | Arcese et al. ................ 714/11 |
| 2006/0271825 A1 * | 11/2006 | Keaffaber et al. ............ 714/38 |
| 2007/0011419 A1 * | 1/2007 | Conti ................. G06F 12/1458 711/163 |
| 2007/0014395 A1 * | 1/2007 | Joshi et al. .................... 380/28 |
| 2011/0191855 A1 * | 8/2011 | De Keukelaere et al. ..... 726/25 |

(Continued)

OTHER PUBLICATIONS

Preliminary Search Report dated Jan. 21, 2014 from French Application No. 1353767, 1 Page.

(Continued)

*Primary Examiner* — Jason C Chiang
(74) *Attorney, Agent, or Firm* — MH2 Technology Law Group, LLP

(57) ABSTRACT

Methods and systems of simulating the effects of an attack seeking fraudulently to modify target code that is interpretable by a processor are disclosed. Various implementations may include means and operations for searching for a set of sensitive instructions in the target code; generating an interpretable "simulation" code having instructions representing the result of said attack on the set of instructions; selecting memory registers that might be accessed during the interpretation of the simulation code; interpreting at least a portion of the simulation code; and storing at least one value of the registers during the interpretation in order to enable the effects of the attack to be analyzed.

17 Claims, 2 Drawing Sheets

(56) References Cited

U.S. PATENT DOCUMENTS

2011/0289487 A1* 11/2011 Song .............................. 717/130
2012/0023580 A1* 1/2012 Bancel ............................ 726/23
2013/0103972 A1* 4/2013 Ozer et al. ........................ 714/2
2013/0125245 A1* 5/2013 Hendrickson ............ G11C 7/24
                                                                                                                       726/28

OTHER PUBLICATIONS

Daran, Muriel et al. Software Error Analysis: A Real Case Study Involving Real Faults and Mutations. ACM Sigsoft Software Engineering Notes, Jan. 8, 1996, vol. 21, pp. 158-171.

* cited by examiner

METHOD AND SYSTEM FOR SIMULATING THE EFFECTS OF AN ATTACK ON A COMPUTER CODE

CROSS-REFERENCE TO RELATED APPLICATIONS

This application claims priority to French Application No. 1353767 filed Apr. 25, 2013, the entire disclosure of which is hereby incorporated by reference in its entirety.

BACKGROUND OF THE INVENTION

The present invention relates to the field of making computer applications secure.

The invention applies more particularly to making computer applications secure when the executable or interpretable code might be modified fraudulently, e.g. by fault injection.

The invention applies in particular but in non-limiting manner to protecting applications hosted in a smart card.

In the field of smart cards in particular, fault injection attacks are known that consist in physically disturbing the component, e.g. by using a laser, so as to modify either the code while it is being executed, or else the value of variables being manipulated, where such manipulations make it possible to reach a security breach.

Fault injection attacks seek to change the environment of an embedded circuit so as to modify its behavior, or to insert faults into the instructions that it executes. This may be done for example by disturbing the power supply voltage of the circuit, or by varying its temperature, e.g. using a source of concentrated light aimed on one of its data buses, or by using an electromagnetic source.

Fault injection attacks performed on embedded circuits generally seek to skip a clock of code made up of at least one instruction without executing it. Alternatively, such attacks seek to replace a block of code with at least one so-called "NOP" instruction. Alternatively, such attacks seek to replace the value of at least one parameter for an instruction.

A fault injection attack can have the effect of giving access to a memory register, e.g. a register containing a sensitive resource such as cryptographic keys, or of executing a block of at least one instruction that would otherwise require an access right when no attack is made.

Document US 2011/0126288 discloses a method seeking to detect vulnerabilities in software, to determine whether the vulnerabilities can be corrected, and if so, to correct the vulnerabilities in order to generate code that is secure.

Although that method is most advantageous, it is not suitable for countering attacks that have effects that are difficult to predict.

OBJECT AND SUMMARY OF THE INVENTION

The invention seeks to provide a method that is an alternative to the above-mentioned method.

More precisely, the invention provides a method of simulating the effects of an attack seeking fraudulently to modify target code that can be executed or interpreted by a processor. The method comprises:

a search step of searching for at least one set of at least one sensitive instruction in the target code;

a generation step of generating at least one executable or interpretable "simulation" code having instructions representing the result of an attack on the above-mentioned set of instructions, as a function of at least one rule associated with said set of instructions and stored in a non-volatile memory;

a selection step of selecting at least one memory register that might be accessed during the execution or the interpretation of the simulation code;

an execution or an interpretation step of executing or interpreting at least a portion of the simulation code; and a storage step of storing at least one value of the registers accessed during the execution or the interpretation in order to enable the effects of said attack to be analyzed.

Correspondingly, the invention provides a system for simulating the effects of an attack seeking fraudulently to modify target code that is executable or interpretable by a processor, the system comprising:

search means for searching for at least one set of at least one sensitive instruction in the target code;

generator means for generating executable or interpretation "simulation" code having instructions representing the result of said attack on the above-mentioned set of instructions, as a function of a rule associated with the set of instructions in to non-volatile memory;

selection means for selecting at least one memory register that might be accessed during the execution or the interpretation of the simulation code;

execution or interpretation means for executing or interpreting at least a portion of the simulation code; and storage means for storing at least one value of the registers during the execution or the interpretation in order to enable the effects of said attack to be Thus, and in general terms, the invention does not seek initially to replace the vulnerable code with secure code, but rather to assess the effects of a fault injection attack on certain selected memory registers.

In a particular implementation of the simulation method of the invention, the above-mentioned rule has as its effect at least one of the following effects:

skipping a block of code made up of at least one instruction without executing it;

replacing a block of code with at least one "NOP" instruction;

replacing the value of at least one parameter of an instruction;

allowing access to a memory register containing a sensitive resource, e.g. a cryptographic key; and/or allowing execution of a block of at least one instruction that requires a right of access when no attack is taking place.

These registers may be identified manually by an expert, or automatically with the help of a set of rules. They may correspond to computer objects, to functions, to variables, or to sensitive memory zones, or to a combination thereof. They may be selected in particular as a function of their level of sensitivity.

These memory registers may correspond to particular instructions (e.g. instructions that perform critical functions, such as password verification functions or cryptographic functions) or to particular data, e.g. corresponding to the values of input and output variables of an application, or to variables internal to an application. By way of example, such particular data may correspond to the values of cryptographic keys.

The concept of a "sensitive instruction" in the meaning of the invention should be understood broadly. For example, the instructions may be sensitive a priori, i.e. instructions that are easily identifiable as being sensitive by a person skilled in the art of computer program security, such as instructions seeking to verify the validity of a password or functions giving read or write access to certain memory registers. However they may be instructions where it is more difficult to access that they are critical, such as functions for initializing variables or instructions for performing a conditional structure. The sensitive instructions may also be selected randomly within the target code.

By way of example, the target code is code that results from compiling source code. For example it may be code that is intermediate between source code and executable code, e.g., a bytecode, or an assembler code resulting from compiling source code in the Java language or in the C language.

In a particular implementation of the simulation method of the invention, the simulation code representing the result of an attack on a set of sensitive instructions is generated from the target code by performing at least one of the following operations:

deleting the set of sensitive instructions;
adding at least one Set of instructions; and/or
substituting the set of sensitive instructions by at least one instruction, e.g. substituting one operand by another.

In accordance with the invention, the executed simulation code may represent the result of an attack on one or more sets of sensitive instructions.

Furthermore, for a given set of sensitive instructions, a plurality of simulation codes may be generated.

The selected registers and the values taken during execution of the simulation code may be analyzed as such by a specialist in software security. However in a preferred implementation, the simulation method of the invention includes a step of analyzing register values.

This analysis step may fox example comprise comparing the register value with a value expected for the register in the absence of an attack, and possibly incrementing a counter as a function of the result of the comparison, typically when the values differ. If this counter has a large value, then that serves to identify that the simulation attack has led to a block of instructions being executed that, in the absence of an attack, would not have been executed.

To this end, in an implementation of the invention, the target code is executed and the values of the registers that are accessed during this execution are stored, these values corresponding to the values that the registers ought to take during normal execution of the code in the absence of an attack. The analysis can then consist in comparing the values of these registers with the values taken by these registers when executing the simulation code.

By way of example, the analysis step makes it possible to identify changes in behavior that are associated with sensitive functions.

The analysis step may thus serve to identify the line(s) of source code associated with the disturbance implemented in the simulation code, and also the line(s) of source code disturbed by the attack.

The analysis serves to identify the portions of target code in which a fault injection attack might in particular lead to accessing a sensitive resource. Countermeasures may be applied to these portions, e.g. by implementing integrity measures or by applying the principle of time redundancy. By way of example, this principle seeks to call a given algorithm several times over, e.g. an encryption algorithm, using the same input data and then comparing the calculated outputs.

The counter serves to measure the number of times a given register is impacted by the attack.

In a particular implementation, the simulation method of the invention includes a step of classifying the attack as function of the results of said analysis step.

By way of example, the classification step takes account of the value of the counter and/or of the fact that the above-mentioned selected registers have indeed been accessed, or not, and under what conditions.

This classification step may also be performed by automatic classification, e.g. calling on machine learning.

When the simulated target code is for incorporating in a device, e.g. a smart card, the simulation system of the invention may be constituted in particular by a simulator, i.e. a computer that simulates the behavior of the device.

In a variant, the simulation system of the invention may comprise an emulator, e.g. a real time emulator, that is connected by a probe to the device for which it physically replaces the processor.

BRIEF DESCRIPTION OF THE DRAWINGS

Other characteristics and advantages of the present invention appear from the following description made with reference to the accompanying drawings and showing an embodiment having no limiting characters.

In the figures.

In the appendices:

Appendix 1 is an example of target code;
Appendix 2 is an example of source code corresponding to the target code of Appendix 1;
Appendices 3A to 8F are examples of simulation code; and
Appendix 4 is an example of target code including countermeasures.

DETAILED DESCRIPTION OF THE INVENTION

Figure 1:
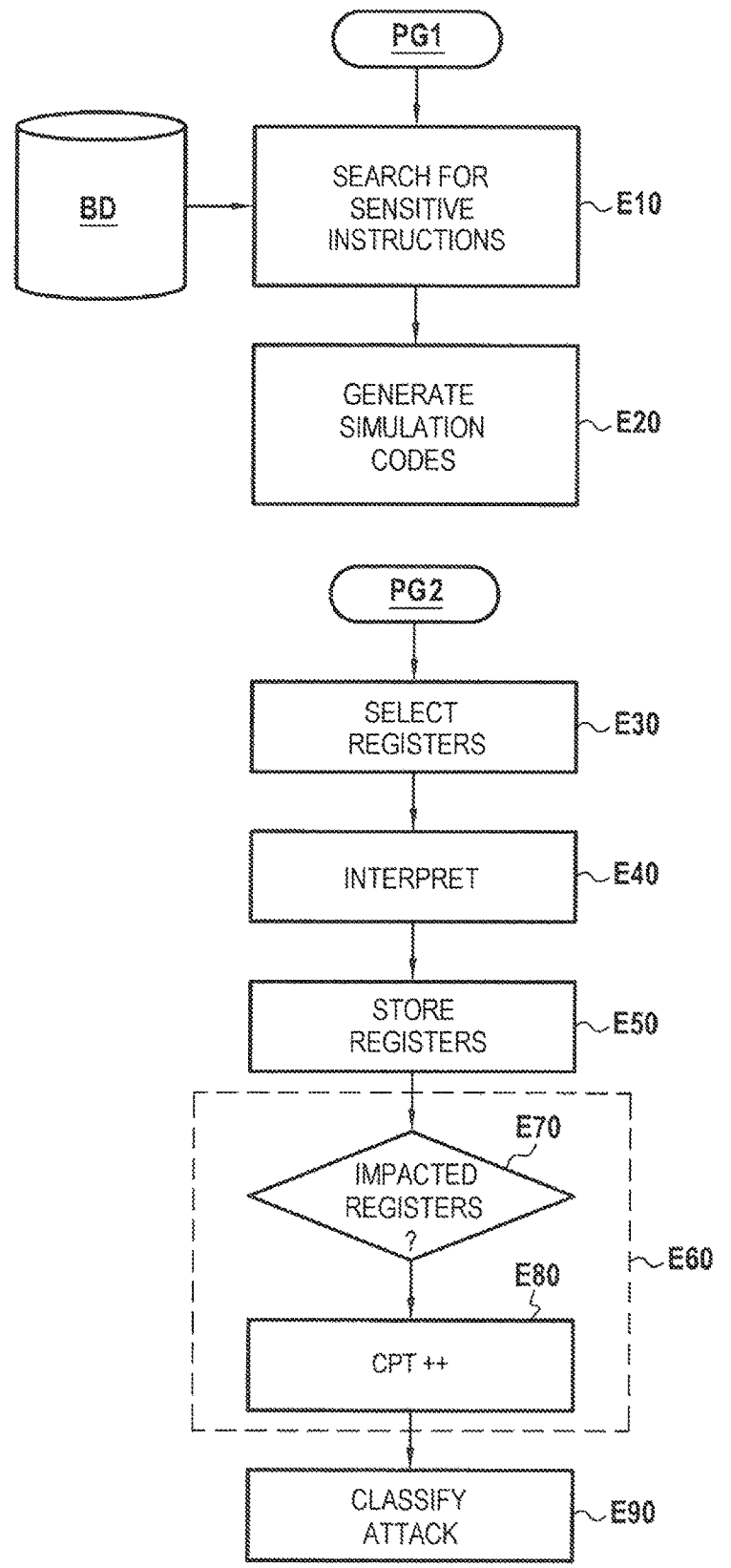
FIG. 1 is a flow chart showing the main steps of a simulation method in a particular implementation of the invention.
Figure 2:
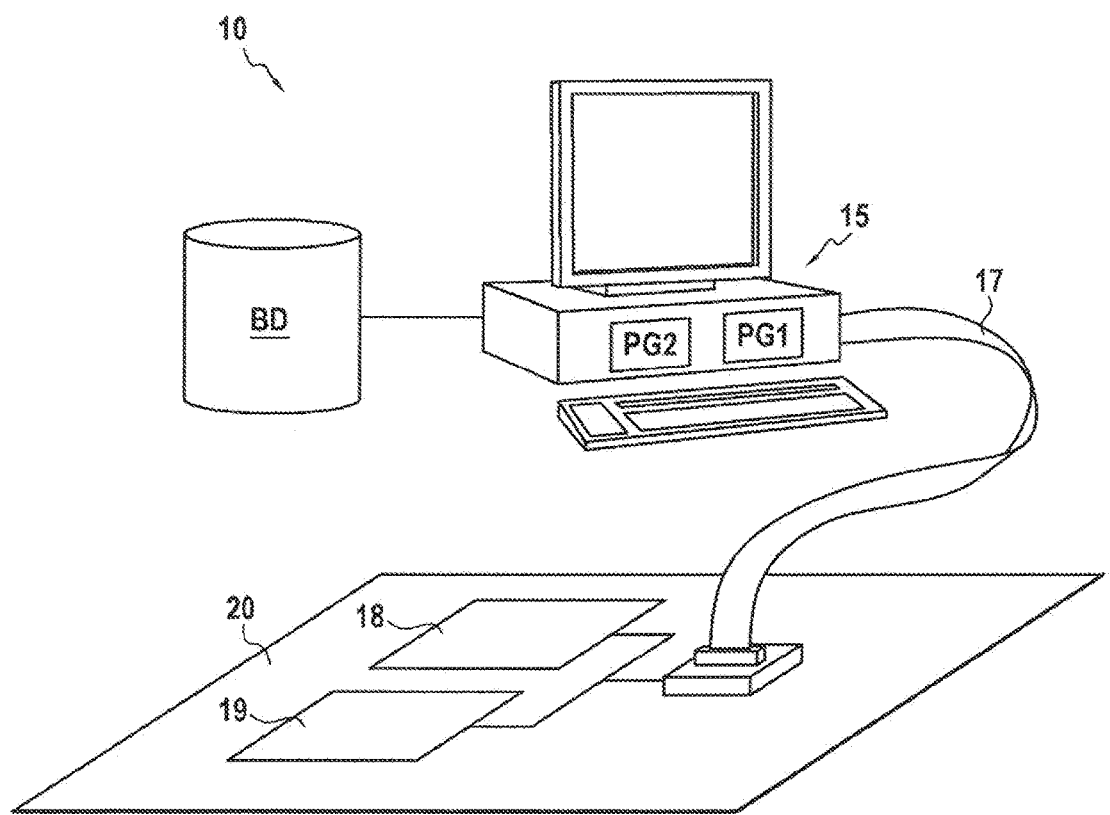
FIG. 2 shows a simulation system in accordance with a particular embodiment of the invention.

FIG. 1 is a flow chart showing the main steps of a simulation method in accordance with the invention. The method is performed by the simulation system 10 in accordance with the invention and as shown in FIG. 2.

In the presently-described implementation, the simulation method of the invention seeks to simulate the effects of attacks by fault injection seeing fraudulently to modify a bytecode resulting from compilation of Java source code that can be interpreted by the processor of a smart card 20.

The smart card 20 includes in particular a non-volatile memory 18 of the electrically erasable programmable read only memory (EEPROM) type or of the Flash memory type, together with a random access memory (RAM) 19.

An example of target code CC in Java bytecode is given in Appendix 1. This target code CC is the result of compiling the Java code of Appendix 2.

The example Java code given in Appendix 2 has the function of allowing an access function "GrantAccess( )" to be executed if and only if the variable "PIN" is equal to the constant "OK".

The corresponding bytecode of Appendix 1 comprises three instructions:
load into memory the value stored in the memory register VAR_PIN corresponding to the variable "PIN";
compare this value with the constant "OK"; and if the compared values are equal, jump to the address FN_GA corresponding to the first instruction of the "GrantAccess( )" function.

In the presently-described embodiment, the simulation system 10 of the invention comprises an emulator 15 (specifically a development computer) connected by a probe 17 to smart card 20 with the emulator emulating the microprocessor of the smart card.

In the presently-described embodiment, the emulator 15 is a real time emulator capable of complying with the real time constraints of the microprocessor of the smart card.

In the presently-described embodiment, the development computer 15 is suitable for executing a computer program PG1 for generating simulation codes that are to be loaded into the EEPROM 18 of the smart card 20 and a computer program PG2 for emulation proper.

In the presently-described embodiment, the emulator 15 has access to a database BD containing rules RG1 to RG5 associated with sets of sensitive instructions ENS1, ENS2. An example of such a database BD is given below.

| ENS1 | CMP xx | RG1 | CMP 1, 1 |
| ENS1 | CMP xx | RG2 | CMP 0, 1 |
| ENS2 | JUMP IF EQUAL xx | RG3 | |
| ENS2 | JUMP IF EQUAL xx | RG4 | JUMP IF NOT EQUAL xx |
| ENS3 | CMP xx | RG5 | |
| | JUMP IF EQUAL xx | | |

The rules RG1 RG2, RG3, RG4, and RG5 in this database BD should be understood as follows:

rule RG1: replace the set of sensitive instructions ENS1 "CMP xx" with the instruction "CMP 1, 1" for which the result is always true;

rule RG2: replace the set of sensitive instructions "CMP xx" by the instruction "CMP 0, 1" for which the result is always false;

rule RG3: delete the set of sensitive instructions "JUMP IF EQUAL xx";

rule RG4: replace the set of sensitive instructions "JUMP IF EQUAL xx" with "JUMP IF NOT EQUAL xx"; and rule RG5: delete the set of sensitive instructions "CMP xx; JUMP IF EQUAL xx".

During a step E10 of the method of the invention, the computer program PG1 executed by the computer 15 searches the target code CC for sensitive instruction sets. Ideally, the computer program PG1 searches for all of the sensitive instructions, i.e. in this example all of the instructions of type ENS1, ENS2, or ENS3. In this example, two sets of sensitive instructions are identified, namely "CMP VAR_PIN, OK" and "JUMP IF EQUAL FN_GA", corresponding to the sets ENS1 and ENS2.

During a step E20, the computer program PG1 generates one or more simulation codes, with instructions that represent the result of a fault-injection attack on the sets of sensitive instructions identified in step E10, as a function of the rules RG1 to RG5. Ideally, the computer program PG1 generates all of possible simulation codes by applying all of the rules RG1 to RG5 that are applicable to all of the sensitive instructions.

In the presently-described implementation, the computer program PG1 generates six simulation codes CS1 to CS6 (Java bytecodes) as given in Appendices 3A to 3F.

It may be observed that the code CS6 in Appendix 3F is obtained by applying rules RG2 and RG4 that are associated with two sets of sensitive data ENS1 and ENS2.

During a step E30 performed by the computer program PG2, the user of the emulator 15 selects at least one memory register that might be accessed while executing or interpreting said simulation code.

In the presently-described implementation, it is assumed that the user selects the registers VAR_PIN and FN_GA so as to verify whether the variable "PIN" is subjected to read/write access and whether the function "GrantAccess( )" is executed.

Thereafter, the user loads one of the simulation codes into the EEPROM 18 of the smart card 20, e.g. the simulation code CS1.

In the presently-described implementation, the user loads into the non-volatile memory of the emulator 15 the values VAR_PIN_CC and FN_GA_CC as stored in the registers VAR_PIN and FN_GA while executing the target code CC, i.e. when there is no attack. In other words, these values correspond to the values generated when executing target code that corresponds to the undisturbed simulation code.

The user causes the simulation code to be interpreted/executed during a step E40. Previously, and in known manner, the user may position stop points in the bytecode CS1 and execute the program up to a stop point, in continuous manner or step by step.

The accesses to the register VAR_PIN of the RAM 19 and to the register FN_GA of the EEPROM 18 as selected in step E30 are stored in the memory of the emulator 15 (step E50).

In the presently-described implementation, the simulation method of the invention includes a general step E60 of analyzing the values of the registers VAR_PIN and FN_GA.

This analysis step uses a counter CPT that is reinitialized or launching execution, and that is incremented (step E80) on each occasion that either one of the registers VAR_PIN or FN_GA differs from the values VAR_PIN_CC or FN_GA_CC (test step E70). A high value for this counter may for example serve to identify that the disturbance has led to an execution path being executed other than the path followed in the absence of disturbance.

In the presently-described implementation, the simulation method of the invention includes a step E90 of classifying the attack represented by the simulation code CS1 as a function of the result of the analysis step.

In the presently-described implementation, this classification step uses a classification function FH. By way of example, this classification function may take account of the value of the counter in combination with the natures of the variables stored in the registers impacted by the attack (access code, cryptographic key, authentication function, . . . ).

Once this analysis has terminated, the user may load the following simulation code CS2 into the EEPROM 18 of the smart card 20, and then rerun the above-described process to measure the effects of another attack.

After performing these various simulations, the user can decide to modify the source code in order to insert countermeasures therein, then generate new target codes, and then apply the simulation method to the new target code in order to measure the effectiveness of the countermeasures.

An example of modified source code is given in Appendix 4. It enables an access function "GrantAccess( )" to be executed if and only if the variable "PIN" is equal to the constant "OK", it enables at access restriction function "DenyAccess( )" to be executed if and only if the variable "PIN" is equal to the constant "NOK", and it destroys the application if the variable "PIN" has a value other than "OK" or "NOK".

APPENDIX 1

```
//CC
    LOAD VAR_PIN
    CMP VAR_PIN, OK
    JUMP IF EQUAL FN_GA
```

APPENDIX 2

```
if (PIN == OK)
{
// GrantAccess( )
}
```

APPENDIX 3A

```
//CS1
    LOAD VAR_PIN
    CMP 1, 1
    JUMP IF EQUAL FN_GA
```

APPENDIX 3B

```
//CS2
    LOAD VAR_PIN
    CMP 0, 1
    JUMP IF EQUAL FN_GA
```

APPENDIX 3C

```
//CS3
    LOAD VAR_PIN
    CMP VAR_PIN, OK
```

APPENDIX 3D

```
//CS4
    LOAD VAR_PIN
    CMP VAR_PIN, OK
    JUMP IF NOT EQUAL FN_GA
```

APPENDIX 3E

```
//CS5
    LOAD VAR_PIN
```

APPENDIX 3F

```
//CS6
    LOAD VAR_PIN
    CMP 0, 1
    JUMP IF NOT EQUAL FN_GA
```

APPENDIX 4

```
if (PIN == OK)
{
// GrantAccess( )
} else if (PIN == NOK) {
//DenyAccess( )
} else {
//KillApplet( )
}
```

The invention claimed is:

1. A method of simulating the effects of an attack seeking fraudulently to modify target code that can be executed or interpreted by a processor, the method comprising:

searching for at least one set of at least one sensitive instruction in said target code;

generating at least one executable or interpretable "simulation" code having instructions representing the result of said attack on said at least one set as a function of at least one rule associated with said at least one set in a database;

selecting at least one memory register that might be accessed during execution or interpretation of said simulation code before the execution or the interpretation, said selecting being made as a function of a level of sensitivity of said at least one memory register, wherein said selecting comprises selecting a memory register that corresponds to an instruction that performs a critical function;

executing or interpreting at least a portion of said simulation code; and storing at least one value of said at least one memory register during said execution or said interpretation to enable the effects of said attack to be analyzed.

2. A simulation method according to claim 1, wherein said simulation code is generated from said target code by performing at least one of the following operations:

deleting at least one sensitive instruction from said at least one set;

adding at least one instruction to said at least one set; and substituting said at least one set of at least one sensitive instruction with at least one instruction.

3. A simulation method according to claim 1, wherein said at least one rule has as its effect at least one of the following effects:

skipping a block of code made up of at least one instruction without executing the block of code;

replacing a block of code with at least one "null operation" (NOP) instruction;

replacing the value of at least one parameter of an instruction;

allowing access to a memory register containing a sensitive resource; and allowing execution of a block of at least one instruction that requires a right of access when no attack is taking place.

4. A simulation method according to claim 1, wherein said at least one rule has as its effect at least one of the following effects:

replacing at least one sensitive comparison instruction in the target code by an instruction for which the result is always true;

replacing at least one sensitive comparison instruction in the target code by an instruction for which the result is always false;

deleting from the target code at least one sensitive instruction comprising a conditional jump; and replacing in the target code at least one sensitive instruction comprising a jump conditioned by a first condition with a jump instruction conditioned by some other condition.

5. A simulation method according to claim 1, further including analyzing said at least one value of said at least one memory register.

6. A simulation method according to claim 5 further including comparing said at least one value of said at least one memory register following execution with the value expected for said at least one memory register in the absence of an attack.

7. A simulation method according to claim 6, wherein said analyzing comprises using a counter that is incremented as a function of the result of said comparison.

8. A simulation method according to claim 7, further including classifying said attack as a function of the result of said analyzing, and wherein classifying includes using said counter or the accesses to said at least one selected memory register.

9. A simulation method according to claim 5, further including classifying said attack as a function of the result of said analyzing.

10. A simulation method according to claim 1, wherein said target code is the result of compilation.

11. A simulation method according to claim 1, wherein:
during said searching, a search is made in said target code for all of the sensitive instructions complying with at least one predetermined model; and
generating includes generating all possible simulation codes by subjecting each of said sensitive instructions to each of said rules that are applicable to said sensitive instructions.

12. The method of claim 1, wherein selecting at least one memory register as a function of the level of sensitivity of said at least one memory register comprises:
selecting a memory register that corresponds to a sensitive memory zone.

13. The method of claim 1, wherein the instruction that performs a critical function is an instruction that performs a password verification function.

14. The method of claim 1, wherein the instruction that performs a critical function is an instruction that performs a cryptographic function.

15. The method of claim 1, wherein selecting at least one memory register as a function of the level of sensitivity of said at least one memory register comprises:
selecting a memory register that corresponds to sensitive data.

16. The method of claim 15, wherein the sensitive data comprises data for a cryptographic key.

17. A system for simulating the effects of an attack seeking fraudulently to modify target code that is executable or interpretable by a processor, the system comprising:
a memory containing instructions; and
a processor, operably connected to the memory, that executes the instructions to perform operations comprising:
searching for a set of at least one sensitive instruction in said target code;
generating at least one executable or interpretable "simulation" code having instructions representing the result of said attack on said at least one set as a function of a rule associated with said at least one set in a non-volatile memory;
selecting at least one memory register that might be accessed during execution or interpretation of said simulation code before the execution or the interpretation, said selecting being made as a function of a level of sensitivity of said at least one memory register, wherein said selecting comprises selecting a memory register that corresponds to an instruction that performs a critical function;
executing or interpreting at least a portion of said simulation code; and
storing at least one value of said at least one memory register during said execution or said interpretation to enable the effects of said attack to be analyzed.

* * * * *